United States Patent [19]

Migliarese-Caputi et al.

[11] Patent Number: 4,460,295
[45] Date of Patent: Jul. 17, 1984

[54] SUBMERSIBLE CONNECTOR

[75] Inventors: Jean-Louis Migliarese-Caputi, Paris; Michel P. Baylot; Jacques G. Merle, both of Marseilles, all of France

[73] Assignee: Compagnie Francaise des Petroles, Paris, France

[21] Appl. No.: 350,908

[22] Filed: Feb. 22, 1982

[30] Foreign Application Priority Data

Feb. 25, 1981 [FR] France .................. 81 03717

[51] Int. Cl.³ .............................. B63C 11/00
[52] U.S. Cl. .................... 405/303; 405/190
[58] Field of Search ............ 405/185, 188, 190, 191, 405/303

[56] References Cited

U.S. PATENT DOCUMENTS 3,381,485  5/1968  Crooks et al. ............ 405/191
3,418,818  12/1968  Vincent et al. ............ 405/190
3,463,226  8/1969  Johnson ............ 405/191 X Primary Examiner—David H. Corbin
Attorney, Agent, or Firm—Sughrue, Mion, Zinn, Macpeak and Seas

[57] ABSTRACT

The invention relates to a connector for taking over control of a submerged tool.

The connector comprises two parts, a first part mounted on the tool, and a second part mounted on a movable control appliance. The tool is provided with energy distributors and mechanical actuators are mounted on the first connector part for operating the distributors. The control appliance comprises means for controlling the distributors and mechanical control members controlled thereby are mounted on the second connector part for acting on the actuators. A purely mechanical energy transmission is advantageously provided between the two connector parts.

5 Claims, 4 Drawing Figures

SUBMERSIBLE CONNECTOR

The invention relates to a connector for enabling take over of control of a submerged tool, particularly but not exclusively one installed on the sea bed, so as to provide the control of its various functions. The control is carried out from any suitable control appliance, such as a submarine, a turret, a set of drill pipes, etc., which can be moved into the vicinity of the tool. Such a connector comlprises two parts:

a first, receiving part mounted permanently on the tool, and a second, active part which is carried by the control appliance and which can be coupled to the first part during a working phase of the tool or be separated therefrom and, if appropriate, brought to the surface when the tool is at rest.

Connectors for hydraulic circuits which are connectable and disconnectable under water are already known, but these connectors have serious disadvantages. They make it necessary to use a soluble oil and, consequently, the equipment must be designed for such an oil. Each function of the tool is controlled by means of a separate connection. Disconnection and connection cannot take place instantaneously.

According to the present invention there is provided a take over connector for establishing a link between a submerged tool having energy distributors for activating elements of the tool and a control appliance which can be brought into the vicinity of the tool and which carries means for controlling the distributors, said connector comprising a first, receiving connector part mounted on said tool, a second, active connector part carried by said control appliance, mechanical actuators provided externally on said first connector part for operating the distributors and mechanical control members provided on said second connector part and arranged for acting on said mechanical actuators when said second connector part is brought onto said first connector part.

Any hydraulic link and even any mechanical fastening between the control means of the control appliance and the energy distributors of the tool can be eliminated, so that it is sufficient to place the second, active part of the connector on the first, receiving part of the connector to be in a position to operate the tool function, and, conversely, the second connector part can be separated from the first connector part by simply raising the second part without any prior operation.

The action of said mechanical control members on said mechanical actuators may consist in a displacement of the control members, causing a corresponding displacement of the actuators.

The mechanical actuators may comprise levers and the mechanical control members may comprise push-rods. The mechanical actuators may be displaced by an electrical control or a hydraulic control, for example by hydraulic jacks. It may be simplest to provide for vertical displacement of the push-rods. When the active part of the connector comes to rest on the receiving part of the connector by moving downwards, the lower ends of the push-rods are advantageously spaced from the corresponding respective levers, a push-rod pressing on a corresponding lever only when it is controlled to move downwards. In this way, the connector may be arranged so that there is no contact between respective active members of the two connector parts as long as no control is effected on the push-rods and, even when a control is effected on a push-rod, the push-rod/lever contacts are such that they do not prevent the second connector part from being withdrawn instantaneously from the first connector part if desired.

The energy necessary for the tool to function may be provided or stored in the tool and/or brought from outside e.g. from an intervening appliance or from the surface. For bringing the energy from outside, it is advantageous to provide a first shaft end for receiving energy on the first connector part, and a second shaft end for transmitting energy, which is connected for rotation to a motor on the second connector part, the two shaft ends being arranged so as to come opposite one another when the second connector part is brought onto the first connector part and being provided with means for connecting the shaft ends for rotation.

The first shaft end is connected to means for converting the mechanical energy of rotation which it receives from the second shaft end into electrical or hydraulic energy. The means may be an electric motor supplying the various elements of the tool by means of energy distributors or recharging an accumulator battery connected to the various elements of the tool by means of the energy distributors. The means is preferably a hydraulic pump which pressurises liquid feeding the various elements of the tool by means of the energy distributors.

Other features of the invention will become apparent from the description of an embodiment thereof, given by way of example only, with reference to the accompanying drawings.

Figure 1:
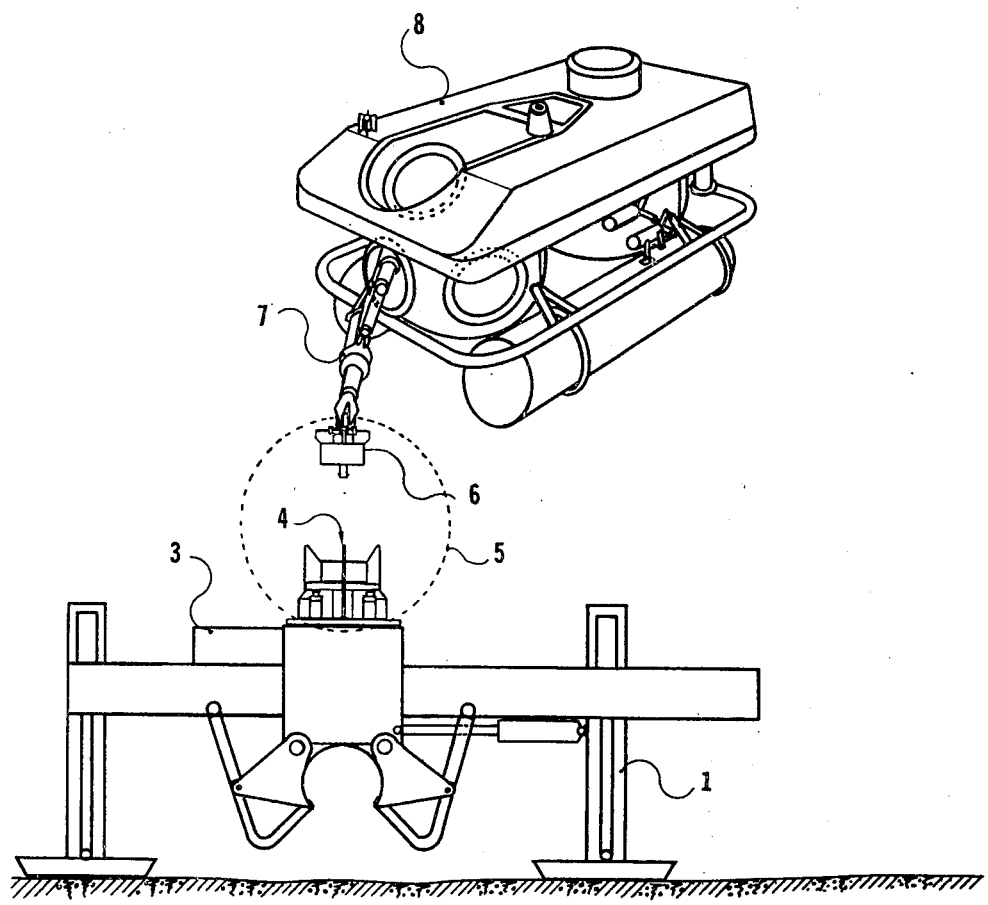
FIG. 1 is a diagrammatic view in elevation of the assembly of a tool, an embodiment of a take over connector according to the invention and a control appliance.

In FIG. 1, an underwater tool 1, shown as a lifting device, comprises hydraulic jacks for causing vertical and horizontal movements of a gripping member controlled by jacks. These jacks are fed by a pump 2, visible in FIG. 2, from a tank 3 at equal pressure. In its upper part the tool 1 carries a first, receiving part 4 of a connector 5, the second, active part 6 of which is carried by a manipulating arm 7 of a control appliance 8, as shown a submarine.

Figure 2:
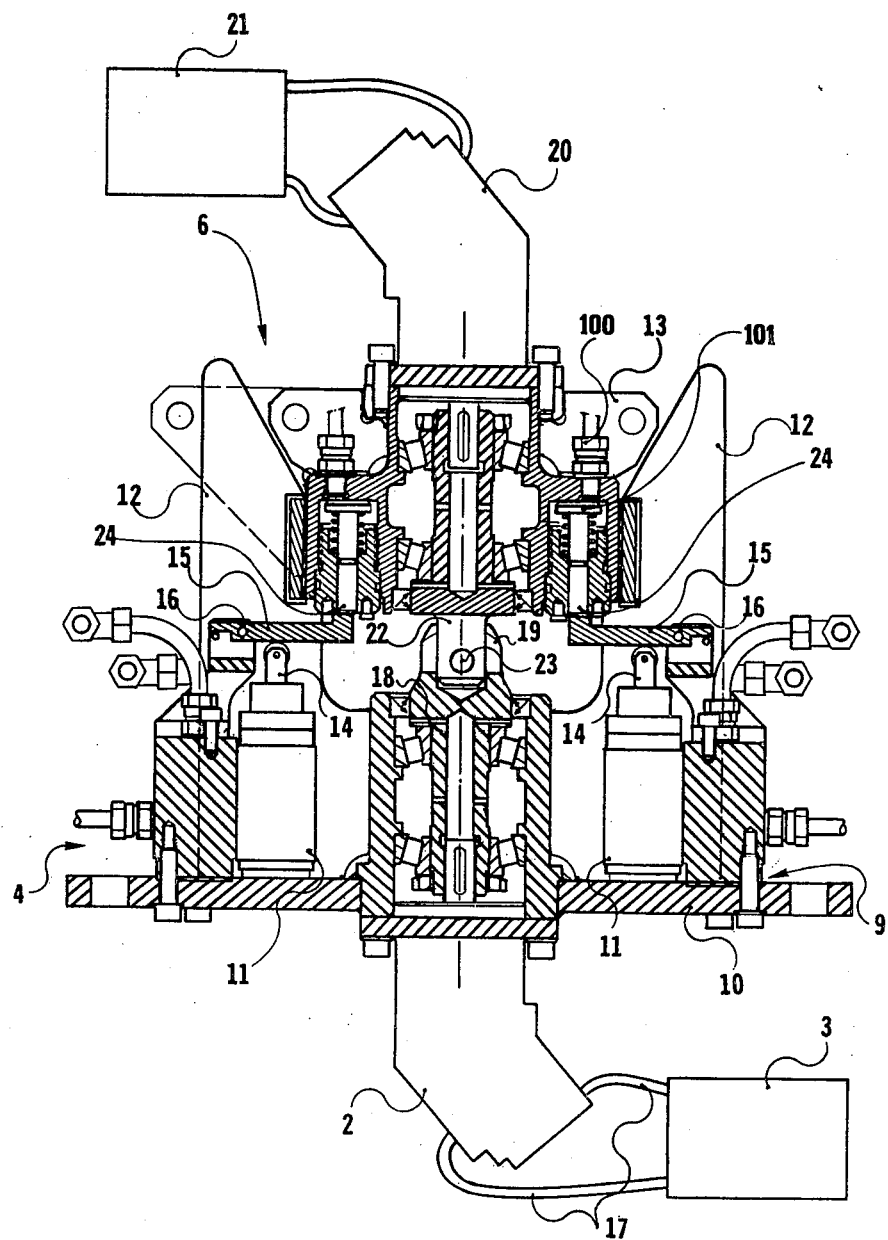
FIG. 2 is a view in elevation, partially in section, of the take over connector, on a larger scale.

FIG. 2 illustrates the connector 5 as a whole with its two parts 4 and 6.

Figure 4:
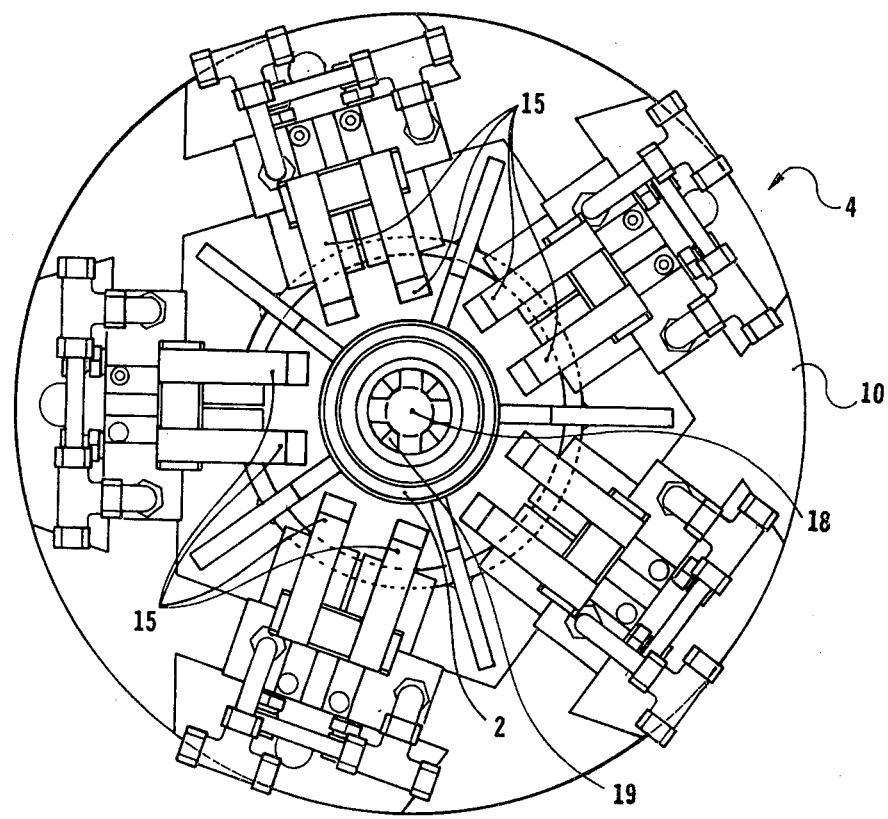
FIG. 4 is a top view of the first part of the connector.

The first, receiving part 4, which may also be seen in FIG. 4, comprises a hollow block 9 open at the top, providing a base plate 10, on which are installed hydraulic distributors 11, each for providing the control of one function of the tool 1, and guide lugs 12 intended for receiving and positioning a hollow cylindrical block 13 of the second connector part 6. The hydraulic distributors 11 are operated by vertical rods 14, on the upper ends of which horizontal levers 15 hinged at points 16 can act. The pump 2 is connected by pipes 17 to the oil tank 3. It is also connected by pipes, not shown, to the distributors 11 and, via these, to the jacks for operating the tool. The pump 2 is driven by a vertical shaft end 18 provided at its free upper end with a female coupling member 19.

Figure 3:
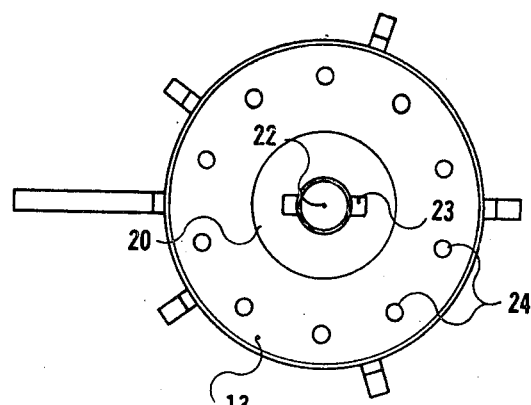
FIG. 3 is a bottom view of the second part of the connector.

The second, active part 6 is provided, at the centre of the cylindrical block 13, with a hydraulic motor 20 fed by a hydraulic unit 21 and coupled to a vertical transmission shaft end 22 provided at its free lower end with a male coupling member 23 capable of inter-acting with, for transmitting rotation to, the female coupling member 19. The member 19 can, for example, comprise one horizontal groove or several horizontal grooves, into which or into one of which is inserted the member 23 which comprises, for example, a horizontal pin, when the part 6 is put in place on the part 4. The cylindrical block 13 carries on its periphery hydraulic jacks 101 fed at 100 by the hydraulic unit 21; the vertical push-rods 24 of these jacks may be seen in FIGS. 2 and 3. Each push-rod 24 is located above a lever 15 when the part 6 is put in place on the part 4.

In this way, the part 4 and the part 6 of the connector 5 each have their own hydraulic circuits which always remain separate from the hydraulic circuits of the other part. The action of the part 6 on the part 4 is effected solely by mechanical transmissions: push-rods 24 moving the levers 15 and shaft ends 22 and 18 coupling with one another. The part 6 can be raised at any moment, without having to take any preliminary measure, and there is no risk of pollution of the hydraulic circuits by sea water during the connections and disconnections.

Thus use of the above described connector overcomes the disadvantages of the known connectors because any contact of oil with the water in which the tool is submerged is avoided and because instantaneous connection and disconnection of the two parts of the connector are possible.

Many alternative embodiments can, of course, be adopted, without departing from the scope of the invention, allowing the transmission of commands between the active part and the receiving part of the connector purely by means of mechanical links.

We claim:

1. A take over connector for establishing a link between a submerged tool having energy distributors for activating elements of the tool and a control appliance which can be brought into the vicinity of the tool and which carries means for controlling the distributors, said connector comprising a first, receiving connector part mounted on said tool, a second, active connector part carried by said control appliance, mechanical actuators provided externally on said first connector part for operating the distributors, and mechanical control members provided externally on said second connector part, operatively engaging said mechanical actuators when said second connector part is brought onto said first connector part, and being acted on by said mechanical actuators.

2. A connector according to claim 1, wherein said mechanical actuators comprise levers, and said mechanical control members comprise push-rods.

3. A connector according to either claim 1 or claim 2, comprising a first shaft end for receiving energy on said first connector part, and a second shaft end for transmitting energy, connected for rotation by a motor and on said second connector part, wherein said shaft ends are arranged so as to come opposite one another when said second connector part is brought onto said first connector part and are provided with means for connecting said shaft ends for rotation.

4. A connector according to claim 3, wherein said first shaft end is connected to drive a pump for pressurising liquid in a hydraulic circuit connected to said energy distributors.

5. A connector according to claim 3, wherein said second shaft end is connected to be driven by a hydraulic motor.

* * * * *